United States Patent [19]

McNeely

[11] 4,327,047

[45] Apr. 27, 1982

[54] METHOD FOR PRODUCING DISC RECORDS HAVING MOLDED-IN CENTER HOLES

[75] Inventor: Michael L. McNeely, Indianapolis, Ind.

[73] Assignee: RCA Corporation, New York, N.Y.

[21] Appl. No.: 200,140

[22] Filed: Oct. 24, 1980

Related U.S. Application Data

[62] Division of Ser. No. 93,012, Nov. 9, 1979.

[30] Foreign Application Priority Data

Apr. 30, 1979 [GB] United Kingdom ............... 14992/79

[51] Int. Cl.³ .............................................. B29D 17/00
[52] U.S. Cl. .................................... 264/107; 264/155; 264/161; 264/163; 425/810
[58] Field of Search ............... 264/107, 155, 161, 163; 425/806, 810, DIG. 51, 302.1

[56] References Cited

U.S. PATENT DOCUMENTS 4,085,178 4/1978 McNeely ........................ 264/161 X

FOREIGN PATENT DOCUMENTS 1187968 4/1970 United Kingdom ................ 264/107

Primary Examiner—Thomas P. Pavelko
Attorney, Agent, or Firm—Birgit E. Morris; Donald S. Cohen

[57] ABSTRACT

A mold for molding an information record having a relatively large diameter hole therethrough includes upper and lower mold members movable toward and away from each other. The upper mold member has a hole-forming pin extending therethrough and slidable therein. The pin has a recess in its end surface which faces the lower mold member. The recess has in a surface thereof at least one re-entrant which forms a lip. In molding a record, a plastic preform is placed between the mold members. The heated mold members are closed against the preform causing the plastic material to flow outwardly and fill the cavity between the mold members. The hole-forming pin is pushed through the plastic material with some of the plastic material filling the recess to form the hole in the record. When the mold members are separated the plastic material in the recess in the pin is retained in the recess by the lip.

3 Claims, 3 Drawing Figures

METHOD FOR PRODUCING DISC RECORDS HAVING MOLDED-IN CENTER HOLES

This is a division, of application Ser. No. 093,012, filed Nov. 9, 1979.

BACKGROUND OF THE INVENTION

The present invention relates to a method and apparatus for producing a disc record with a relatively large diameter center hole, and particularly to a method and apparatus for molding-in the center hole in the disc record.

It has been found desirable to provide an information record with a relatively large diameter center hole, i.e., about 1.5 inches (3.8 cm) in diameter. Heretofore small diameter center holes on the order of 0.25 inch (0.6 cm) in diameter, have been molded-in in disc records as shown by U.S. Pat. No. 3,662,051 to L. C. Harlon et al, issued May 9, 1972 entitled "Automatic Record Molding Apparatus and Method". However, large diameter holes are more difficult to mold-in since considerably more materials must be displaced during molding.

It is also possible to punch the record center hole after the record has been molded. This approach, however, is undesirable from a cost viewpoint since it requires additional equipment and process steps. This approach is also undesirable where the record center hole is relatively large, and where the record is relatively brittle. A further disadvantage of this technique is that it generates debris which may remain on the record and disrupt the playback of the record.

Another record manufacturing approach may utilize an in-mold punching operation in the manner described in U.S. Pat. No. 3,989,436, issued to McNeely et al on Nov. 2, 1976. However, where the record is relatively brittle, it is difficult to punch out relatively large diameter center holes without damaging the record surface.

SUMMARY OF THE INVENTION

A mold for molding an information record includes a pair of spaced mold members movable toward and away from each other and a pin extending through and slidably mounted in one of the mold members for forming the center hole in the molded record. The pin includes a recess in its end surface which faces the other mold member with the recess having in a surface thereof at least one re-entrant which forms a lip for holding molding material in the recess.

DETAILED DESCRIPTION

Figure 1:
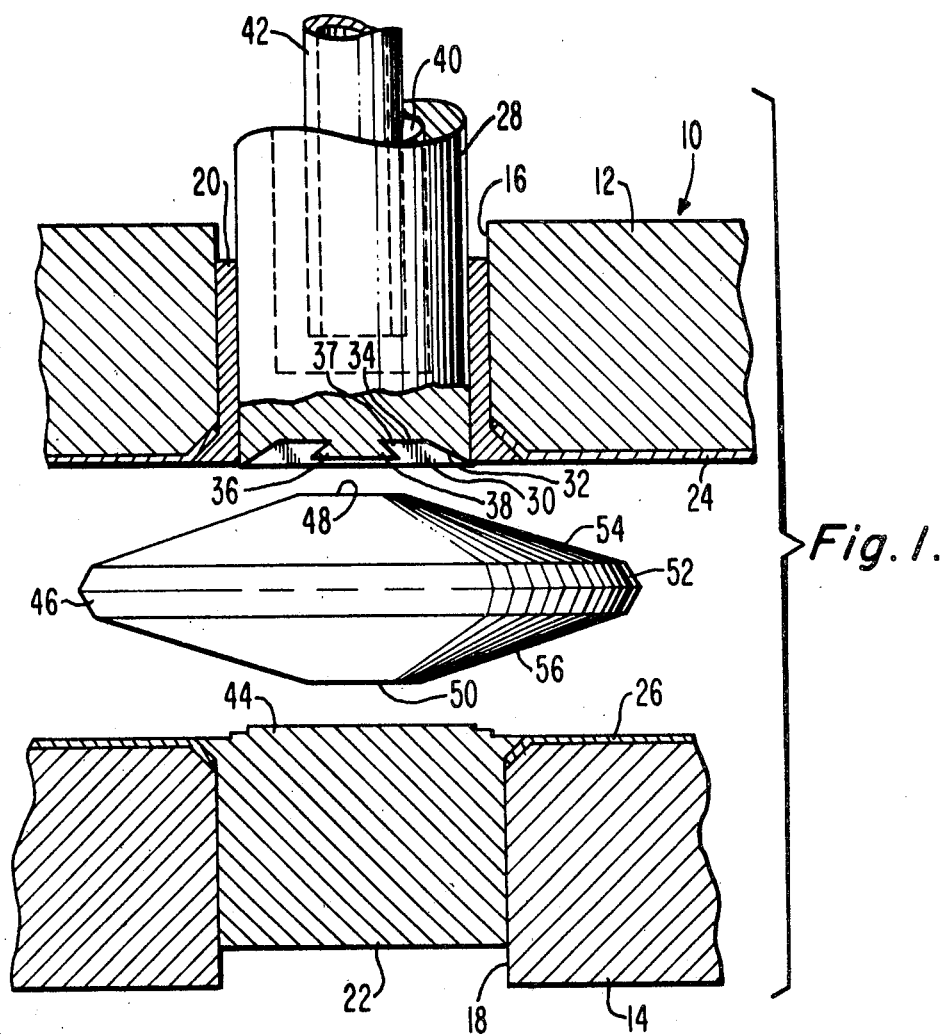
FIG. 1 is a schematic view of a portion of a molding press having the center pin of the present invention for molding-in the center hole.

Referring to FIG. 1, there is schematically shown a portion of a record making press 10. The press 10 includes upper and lower mold plates 12 and 14 which are mounted so that at least one of them is movable toward and away from the other. The mold plates 12 and 14 have aligned center openings 16 and 18 respectively therethrough in which are mounted center plates 20 and 22 respectively. Stampers 24 and 26 are mounted on the opposed surfaces of the mold plates 12 and 14 respectively. The stampers 24 and 26 are thin metal plates having on the surface thereof the negative of the impression to be applied to the surface of the molded record. The stampers 24 and 26 are in part secured to the mold plates 12 and 14 by the center plates 20 and 22 respectively.

A center hole forming pin 28 extends through and is slidable in the center plate 20 of the upper mold plate 12. The center hole forming pin 28 is cylindrical and has an outer diameter corresponding to the desired diameter for the hole in the recorded disc, e.g., about 1.5 inches (3.8 cm) for a video disc. The pin 28 has a recess 30 in its end surface which faces the bottom center plate 22. The side wall 32 of the recess 30 is conical and tapers radially inwardly from the edge of the end surface to a flat bottom surface 34. A nub 36 projects from the center of the bottom surface 34 and has a length shorter than the depth of the recess 30. The nub 36 has a re-entry 37 which forms a lip 38 around the end of the nub 36.

The pin 28 has a longitudinal passage 40 therethrough which stops before it reaches the recess 30. A pipe 42 extends through the passage 40 and stops short of the end of the passage. The pipe 42 and passage 40 serve to permit the flow of a heating and cooling medium through the pin 28 to heat and cool the pin.

The top surface 44 of the bottom plate 22 may be completely flat or, as shown, may have a raised portion to assist in forming the center hole in the molded disc. Also, the bottom center plate 22 may be provided with means for heating and cooling it during the molding cycle along with heating and cooling the pin 28 or, as shown, the bottom center plate 22 may be maintained at a constant temperature.

To make a record the mold plates 12 and 14 are separated (i.e., opened) and a preform 46 of the plastic material desired for the record is placed between the mold plates. The design of the preform 46 is described in detail in my co-pending application for U.S. Letters Patent Ser. No. 066,769, filed Aug. 15, 1979, entitled "Video Disc Preform and Method of Making a Disc Therefrom". In general, the preform 46 has flat top and bottom surfaces 48 and 50 which are smaller in diameter than the diameter of the pin 28, a center portion 52 which is larger in diameter than the top and bottom surfaces 48 and 50, and conical sections 54 and 56 extending between the top and bottom surfaces 48 and 50 and the central portion 52 respectively. The preform 46 is placed between the mold plates 12 and 14 with the top and bottom surfaces 48 and 50 being aligned with the pin 28 and the bottom center plate 22. In an automatic molding press the preform 46 is placed between the mold members 12 and 14 by a preform loading arm (not shown).

The center hole forming pin 28 is then extended downwardly until the preform 46 is clamped between the pin 28 and the bottom center plate 22. This holds the preform 46 in place as the preform molding arm is withdrawn. The mold plates 12 and 14 are then moved toward each other, (i.e., closed) generally by moving the top mold plate 12 downwardly against the bottom mold plate 14. As the mold plates 12 and 14 are closed, the center hole-forming pin 28 is retracted. As the mold plates 12 and 14 are moved together they contact the preform 46 so that the preform 46 is heated and caused to flow radially outwardly between the stampers 24 and 26. At the time that enough of the preform 46 has flowed over and completely covers the bottom center plate 22, the center hole-forming pin 28 is again extended to contact the preform. As the mold members 12 and 14 are completely closed the center hole-forming pin 28 is advanced through the preform to push out the plastic material from the center hole area. During this cycle steam or other heating media is flowed through the pipe 42 and passage 40 to heat the center hole-forming pin 28 and thereby assure proper definition of the record center hole. During the molding of the first record with a clean pin 28, as the pin 28 passes completely through the plastic material and reaches the surface 44 of the bottom center plate 22, any plastic material trapped between the pin 28 and the center plate 22 will flow into the recess 30 in the pin 28 so as to complete the formation of the center hole in the record. After the first record, the plastic material from the previous cycle which remains in the recess 30, as will be explained, acts as a spring forcing the compound out of the hole area before the edge of the pin 28 bears against the bottom center plate 22.

After the mold plates 12 and 14 are completely closed causing the plastic of the preform 46 to flow radially outwardly and completely fill the space between the stampers 24 and 26, the mold plates 12 and 14 are cooled to cause the record to harden. Simultaneously, the center hole-forming pin 28 is cooled by passing a coolant through the pipe 42 and passage 40. This causes the plastic material trapped in the recess 30 to harden. The mold plates 12 and 14 are opened by moving the upper mold plate 12 away from the lower mold plate 14 to permit removal of the molded disc. This also retracts the center hole-forming pin 28 which carries with it the hardened plastic material entrapped within the cavity 30. The lip 38 of the nub 36 engages the hardened plastic material to hold it within the cavity 30.

The above cycle is then repeated to mold additional discs. During each cycle the heating of the center hole-forming pin 28 softens the plastic material trapped in the cavity 30 so that it acts as a spring to help force the plastic material of the preform away from the center hole being formed. Thus, there is provided in a relatively brittle record a large center hole which is molded into the disc at the same time that the disc is itself molded.

Figure 2:
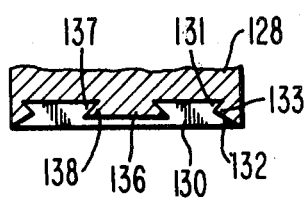
FIG. 2 is a sectional view of an end portion of a modification of the center pin of the present invention.

Referring to FIG. 2 there is shown a center hole-forming pin 128 having a modified recess 130 in its end surface. The recess 130 is the same as the recess 30 previously described with the addition of a second re-entry 131 along the side surface 132 to provide a second lip 133. The recess 130 also includes the nub 136 having a re-entry 137 to form a lip 138. The additional lip 133 helps hold the plastic material in the recess 130 when the mold is opened after forming the disc. If desired, when having a recess which includes the re-entry at the side wall, the nub in the center of the recess can be eliminated and the one lip will serve to hold the material in the recess.

Figure 3:
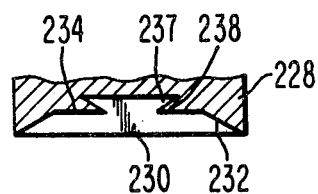
FIG. 3 is a sectional view of the end portion of still another modification of the center pin.

Referring to FIG. 3 there is shown a center hole-forming pin 228 having a recess 230 in its bottom surface. The recess 230 has a conical side wall 232 extending to a flat bottom surface 234. A re-entry 237 is provided in the bottom surface 234 to form a lip 238. When the center hole-forming pin 228 is moved through the preform to form the center hole, the plastic material will fill the recess 230, including the re-entry 237. When the center hole-forming pin 228 is cooled, thereby hardening the material in the recess 230, and is retracted, the lip 238 will hold the hardened material in the recess 230. If desired, the recess 230 can also be provided with a re-entry around the outer wall 232 to provide an additional lip for holding the material at the recess 230.

I claim:
1. A method of molding an information record with a molded-in center hole comprising the steps of
(a) placing a preform of plastic material between the open mold plates of a mold press with one of the mold plates having a center hole-forming pin, which pin has a recess in its end surface,
(b) heating the mold plates and closing them against the preform to heat the preform and cause the plastic material to flow outwardly and fill the cavity between the mold plates so as to form the record,
(c) directly heating the center hole-forming pin and moving it through the material of the preform to form the center hole with some of the material entering and filling the recess in the pin,
(d) directly cooling each of said mold plates and the center pin to harden the plastic material, and
(e) opening said mold plates and retracting said center hole-forming pin to permit removal of the molded disc, the pin retaining in its recess some of the hardened plastic material.

2. The method in accordance with claim 1 in which after the preform is placed between the mold plates the center hole-forming pin is moved against the preform to hole it in place between the mold plates until the mold plates are closed against the preform.

3. The method in accordance with claim 2 in which when the mold plates are closed against the preform the center hole-forming pin is retracted away from the preform before being moved through the material of the preform.

* * * * *